July 10, 1923.  1,461,287
E. PFIFFNER
HIGH TENSION CONDENSER
Filed Jan. 10, 1922
Fig.1  Fig.2  Fig.3
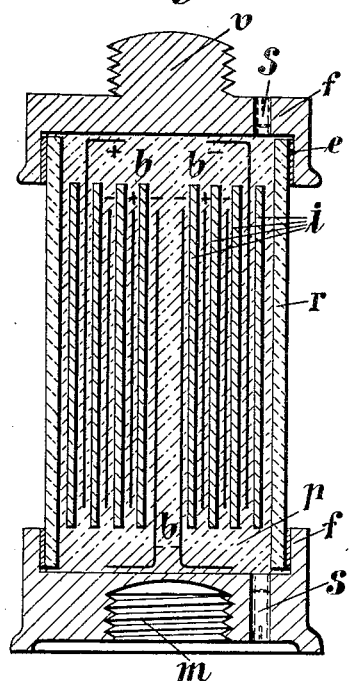
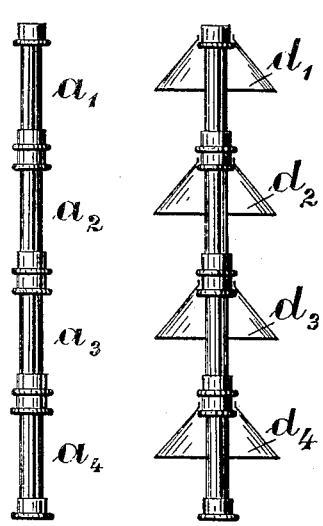
Fig.4
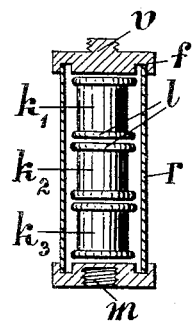
Inventor
E. Pfiffner,
By Marks & Clerk
Attys.

Patented July 10, 1923.

1,461,287

UNITED STATES PATENT OFFICE.

EMIL PFIFFNER, OF FRYBOURG, SWITZERLAND.

HIGH-TENSION CONDENSER.

Application filed January 10, 1922. Serial No. 528,132.

*To all whom it may concern:*

Be it known that I, EMIL PFIFFNER, a citizen of the Republic of Switzerland, residing at Hotel de Rome, Frybourg, Switzerland, have invented new and useful Improvements in High-Tension Condensers, of which the following is a specification.

The high tension condensers used hitherto for the purpose of protection from excess voltage for building up electric oscillation circuits and the like show various defects, which reside in their inadequate electric strength, both with regard to the puncturing of the dielectric between coatings of the condenser and with regard to the discharge at the leading in places.

The high tension condenser described below avoids these drawbacks by subdividing the fall of potential at the terminals of the condenser into a number of partial falls and thus builds up the condenser from a number of partial condensers connected in series. By this means a far greater degree of safeness is obtained as regards the puncturing of the dielectric, as each partial condenser is capable of sustaining many times the partial fall of potential apportioned to it and even in the case of the puncturing of a partial condenser the remaining partial condensers still have sufficient electric strength to withstand the terminal voltage.

The condenser according to the invention is thus built on the principle of the socalled chain insulators, both as regards the dielectric between the coatings of the condenser and as regards the distribution of potential on the outer surface of the condenser, which is in communication with the atmosphere, while, in contradistinction to the ordinary chain insulators, the distribution of potential is an approximately fully uniform one, for the sake of greater capacity from member to member.

Besides the excellent electrical properties, this construction has the advantage, just as is the case with chain insulators, that condensers may be put together for voltages of any height, by connecting up a number of similar elements in series, each element of which is built for a relatively low voltage, an advantage which is of special importance from the point of view of manufacture.

If the partial condenser is made with a suitable rain cover, the condenser provided with such rain covers is specially adapted for use in the open air, owing to its character as a chain insulator.

The metal connecting pieces of the partial insulators may be made so heavy that they are capable of giving off the heat occurring in the condenser through dielectric hysteresis losses by heat conduction to the atmosphere.

The conducting pieces can also be constructed so that they can be conveniently connected together by screw threads, bayonet catches, springs or the like.

In the accompanying drawing wherein an approved embodiment of the invention is illustrated, Fig. 1 of the drawing shows a section of the partial condenser, which differs externally in no way from an ordinary support insulator.

Fig. 2 is an elevation of a four-part condenser built up from elements of the type illustrated in Fig. 1;

Fig. 3 is an elevation similar to Fig. 2 showing protecting coverings applied to the several elements;

Fig. 4 is a sectional view of a modification of the invention.

Referring to the drawing in detail,

The parts $f$ are the connectors with the threaded stud $v$ and the corresponding female thread $m$. The connecting pieces are cemented at both ends on to the insulating tube $r$ by the cemented joints $e$.

Conductively connected to the two connecting pieces are the two coatings $b,—b$, which are separated by the dielectric $i$. The coatings $b$ are asssumed to be wound cylindrically together with the insulating layers $i$. The remaining intermediate spaces are filled by the insulating material $p$, which is poured in through the opening for the filling screws $s$.

Fig. 2 shows a four part condenser built up from the elements $a_1$ $a_2$ $a_3$ $a_4$ according to Fig. 1.

Fig. 3 shows the condenser according to Fig. 2, provided with metal or insulating rain covers $d—d_4$, for use in open air.

The most suitable form for the partial condenser is that of the usual, modern supporting insulators, which have a smooth or a fluted surface with sufficient creeping length. In this case the partial insulator can take up mechanical pressure as an element of construction, which is more particularly suitable in cases where columns for high tension are built up from the partial condensers, the bottom element having to sustain the weight of all those placed above it. If the manner of fixing the mounts is a suitable one, the partial insulator can also be stressed mechanically as a tension insulator and whole columns can thus be arranged in suspension. The condenser built up from these partial condensers can be used as a supporting or suspension insulator for attaching conductors.

The condenser located within the insulator forming the partial condenser can itself be subdivided into a number of parts lying in series, by which means on the one hand the safety from puncturing is increased, while on the other hand the fall in potential along the insulating tube forming the insulator is more uniformly distributed than is the case with a one part partial insulator according to Fig. 1. By the uniform distribution of potential all glowing sparks at the insulator surface can be suppressed and the discharge voltage of the insulator will be considerably increased.

Fig. 4 shows a constructional form of such a partial condenser.

Referring more particularly to Fig. 4 $v$, $m$, $f$ and $r$ denote the same parts as in Figure 1 and $k_1$, $k_2$, $k_3$ show the further subdivisions of the partial condenser, each of which is provided with two conducting mounts $l$, to which the coatings are connected and through the mutual contact of which connection is made.

Any other sub-division than that given in Fig. 4 is however also possible.

Having now particularly described and ascertained the nature of my said invention and in what manner the same is to be performed, I declare that what I claim is:

1. A high tension condenser consisting of a plurality of partial condensers connected in series to form a chain insulator, each partial condenser consisting of a hollow tubular supporting insulator, conducting mounts carried by the ends of the insulator and constituting closures therefor, and metal coatings and insulating layers arranged in and completely enclosed by the tubular insulator and conducting mounts.

2. A high tension condenser consisting of a plurality of partial condensers connected in series to form a chain insulator, each partial condenser consisting of a hollow tubular supporting insulator, conducting mounts carried by the ends of the insulator and constituting closures therefor, metal coatings and insulator layers arranged in and completely enclosed by the tubular insulator and conducting mounts, and threaded connections detachably connecting the mounts of adjacent partial condensers.

3. A high tension condenser consisting of a plurality of partial condensers connected in series to form a chain insulator, each partial condenser consisting of a hollow tubular supporting insulator, conducting mounts carried by the end of the insulator constituting closures therefor, metal coatings and insulating layers arranged in and completely enclosed by the tubular insulator and conducting mounts, said conducting mounts having openings therein permitting the introduction of material to form said insulating layers, and closures for said openings.

In testimony whereof I have signed my name to this specification in the presence of two subscribing witnesses.

EMIL PFIFFNER.

Witnesses:
ADOLF URBANTSCHITSCH,
AUG. KARL MAYER.